United States Patent [19]

McColgin et al.

[11] 3,798,566

[45] Mar. 19, 1974

[54] POLYMETHINE DYE LASERS

[75] Inventors: William C. McColgin; Frank G. Webster, both of Rochester, N.Y.

[73] Assignee: Eastman Kodak Company, Rochester, N.Y.

[22] Filed: Nov. 11, 1971

[21] Appl. No.: 197,892

[52] U.S. Cl. ... 331/94.5 L, 252/301.2 R, 260/240 R
[51] Int. Cl. .............................................. H01s 3/20
[58] Field of Search .......... 260/240 R; 252/301.2 R; 331/94.5, 945 L

[56] References Cited
UNITED STATES PATENTS

| | | | |
|---|---|---|---|
| 3,194,805 | 7/1965 | Brooker et al. | 260/240 R |
| 3,521,187 | 7/1970 | Snavely et al. | 252/301.2 R |
| 3,541,470 | 11/1970 | Lankard et al. | 252/301.2 R |
| 2,965,486 | 12/1960 | Brooker et al. | 96/127 |

Primary Examiner—Daniel E. Wyman
Assistant Examiner—A. P. Demers
Attorney, Agent, or Firm—Robert W. Hampton

[57] ABSTRACT

Merocyanine dyes which contain a pyran nucleus as part of the intercyclic chain are useful as laser dyes. These dyes are used in solution with a non-interfering solvent to form lasing media useful in dye lasers. Such lasers generally include a reservoir for containing the laser dye solution and a pumping energy source operably associated therewith for producing stimulated emission of the laser dye solution.

15 Claims, No Drawings

POLYMETHINE DYE LASERS

This invention relates to lasers and more particularly to organic dye lasers and to the use of certain rigidized nitrogen-containing dyes capable of lasing when properly excited.

Lasers (acronym for light amplification by stimulated emission of radiation) or optical masers (acronym for microwave amplification by stimulated emission of radiation) are light amplifying devices which produce high intensity coherent monochromatic light concentrated in a well collimated beam commonly called a laser beam. There are several uses for such laser beams. Since the beam can be sharply focused, it can produce energy densities suitable for drilling, welding, cutting, etc. One potential application of laser beams is in the field of communications where the optical spectrum represents almost limitless bandwidth and information carrying capacity.

It is desirable to have lasers which are operable at many different wavelengths in the light spectrum including infrared, visible and ultraviolet regions. Since the wavelength emitted by a specific energy transition in a laser medium is tunable over only a small portion of the spectrum, it is necessary to provide a number of materials adapted for use as active laser media at various light frequencies. Many of the materials discovered thus far which are capable of acting as laser media have been in the solid and gaseous states. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al., IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing as annular region within an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or nonradiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse or the laser beam.

Although many advances have been made in the field of organic dye lasers, we have now found a new class of lasing dyes. It is, therefore, an object of this invention to provide a novel class of lasing dyes which, upon lasing, emit at a variety of wavelengths.

Another object of this invention is to provide novel liquid lasing media.

These and other objects and advantages are obtained through the use, with dye lasers having a reservoir means containing a laser dye solution and a pumping energy source capable of producing stimulated emission of the solution which comprises a lasing concentration of dye in a non-interfering solvent (i.e., one that does not inhibit stimulated emission), that dye being a polymethine laser dye of the merocyanine type which contains a pyran nucleus as part of the intercyclic chain.

The dyes useful in this invention can be represented by the structural formula:

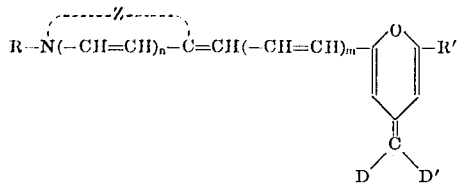

wherein:

R represents an alkyl radical having one to about ten and preferably about one to about four carbon atoms and including substituted alkyl radicals having such substituents as sulfo, carboxy, dialkylamino (having one to about four carbon atoms in the alkyl moieties), hydroxy, alkoxy (having one to about four carbon atoms in the alkyl moiety), acyloxy, alkoxycarbonyl (having one to about four carbon atoms in the alkyl moiety) and an aryl radical; an alkenyl radical having two to about ten and preferably two to about four carbon atoms and including substituted alkenyl radicals; and a monocylic aryl radical including substituted monocylic aryl radicals, e.g., phenyl, halophenyl, (chloro, bromo, etc), alkylphenyl (having one to about four carbon atoms in the alkyl moiety) alkoxyphenyl (having one to about four carbon atoms in the alkyl moiety), hydroxyphenyl, etc;

R' represents a hydrogen atom, an alkyl radical having one to about six and preferably about one to about two carbon atoms and a monoacylic aryl radical as described for R above;

$n$ represents an integer having a value of 0 or 1;

$m$ represents an integer having a value of 0, 1 or 2;

Either carbon atom in the dimethine group having the subscript $m$ can also be substituted with an alkyl radical, an aralkyl radical or an aryl radical, e.g., phenyl, naphthyl, etc;

D and D' each represent a member selected from the group consisting of a cyano radical, an alkoxycarbonyl radical having from one to about four carbon atoms in the alkyl moiety, an acyl radical having one to about four carbon atoms in the alkyl portion and including aracyl radicals (e.g., phenylcarbonyl, etc). a substituted sulfonyl radical having such substituents as alkyl radicals having one to five carbon atoms, aryl radicals and aryloxy and when the moieties D and D' are taken together with the carbon atom to which they are attached, represent a radical having the structure: III.

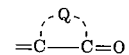

wherein Q represents the non-metallic atoms necessary to complete a five- or six-membered ring of the type used in merocyanine dyes and typically contains at least one hetero atom selected from nitrogen, oxygen, sulfur or selenium. Exemplary cyclic nuclei of the type used in merocyanine dyes and as represented by Formula III above, include an isoxazolinone nucleus (e.g., 3-phenyl-2-isoxazolin-5-one, 3-methyl-2-isoxazolin-5-one, etc.), an oxindole nucleus (e.g., 1-alkyl-2,3-dihydro-2-oxindoles, etc), a 2,4,6-triketohexahydropyrimidine nucleus (e.g., barbituric acid or 2-thiobarbituric acid, as well as their 1-alkyl (e.g., 1-methyl, 1-ethyl, 1-n-propyl, 1-n-heptyl, etc), or 1,3-dialkyl (e.g., 1,3-dimethyl, 1,3-diethyl, 1,3-di-n-propyl, 1,3-diisopropyl, 1,3-dicyclohexyl, 1,3-di(2-methoxyethyl), 1,3-di(dialkylaminoalkyl), 1-alkyl-3-(2-morpholinoalkyl), etc), or 1,3-diaryl (e.g., 1,3-diphenyl, 1,3-di(4-chlorophenyl), 1,3-di-(4-ethoxycarbonylphenyl), 1,3-di(dialkylaminophenyl), etc), or 1-aryl (e.g., 1-phenyl, 1-p-chlorophenyl, 1-p-ethoxycarbonylphenyl, etc), or 1-alkyl-3-aryl (e.g., 1-ethyl-3-phenyl, 1-(n-heptyl-3-phenyl), etc) derivatives, a 2(3H)-imidazo[1,2-a]pyridone nucleus; a 5,7-dioxo-6,7-dihydro-5-thiazolo[3,2-a]pyrimidine nucleus (e.g., 5,7-dioxo-3-phenyl-6,7-dihydro-5-thiazolo[3,2-a]pyrimidine nucleus), a 2-thio-2,4-oxazolidinedione nucleus (i.e., a 2-thio-2,4-(3H,5H)-oxazoledione nucleus) (e.g., 3-ethyl-2-thio-2,4-oxazolidinedione, etc), a thianphthenone nucleus (e.g., 3(2H)-thianaphthenone, 3(2H)-thianaphthenone-1,1-dioxide, etc), a 2-thio-2,5-thiazolidinedione nucleus (i.e., a 2-thio-2,5-(3H,4H)-thiazoledione nucleus) (e.g., 3-ethyl-2-thio-2,5-(3H,4H)-thia-zolidinedione, etc), a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc), a thiazolidinone nucleus (e.g., 4-thiazolidinone, 3-ethyl-4-thia-zolidinone, 3-phenyl-4-thiazolidinone, 3-α-naphthyl-4-thiazoli-dinone, etc.), a 4-thiazolinone nucleus (e.g., 2-ethylmercapto-5-thiazolin-4-one, 2-alkylphenylamino-5-thiazolin-4-ones, 2-diphenylamino-5-thiazolinone-4-one, etc), a 2-imino-2-oxazolin-4-one (i.e., pseudohydantoin) nucleus, a 2,4-imidazolidinedione (hydantoin) nucleus (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-α-naphthyl-2,4-imidazolidinedione, 1,3-diphenyl-2,4-imidazolidinedione, etc), a 1,3-indanedione nucleus, a dione or tetrone nucleus (e.g., 1,3-dioxane-4,6-dione, 2H-pyran-2,4,5,7-(1H,3H,6H)tetrone, etc), a 2-imidazolin-5-one nucleus (e.g., (2-n-propylmercapto-2-imidazolin-5-one, etc), etc. Especially useful are nuclei wherein Q represents the non-metallic atoms necessary to complete a five- or six-membered heterocyclic ring having two hetero atoms at least one of which is nitrogen and the other is selected from nitrogen, oxygen or sulfur;

Z represents the non-metallic atoms necessary to complete a heterocyclic nucleus containing from five to six atoms in the heterocyclic ring, such as those selected from the group consisting of a thiazole nucleus (e.g., thiazole, 4-methyl-thiazole, 4-phenylthiazole, 5-methylthiazole, 5-phenylthiazole, 4,5-dimethylthiazole, 4,5-diphenylthiazole, 4-(2-thienyl)- thiazole, etc), a benzothiazole nucleus (e.g., benzothiazole, 4-chlorobenzothiazole, 5-chlorobenzothiazole, 6-chlorobenzothia-zole, 7-chlorobenzothiazole, 4-methylbenzothiazole, 5-methyl-benzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzo-thiazole, 5-iodobenzothiazole, 6-iodobenzothiazole, 4-ethoxybenzo-thiazole, 5-ethoxybenzothiazole, tetrahydrobenzothiazole, 5,6-dimethoxybenzothiazole, 5,6-dimethylenebenzothiazole, 5-hydroxy-benzothiazole, 6-hydroxybenzothiazole, etc), a naphthothiazole nucleus (e.g., naphtho[1,2]thiazole, naphtho[2,1]-thiazole, naphtho[2,3]thiazole, 5-methoxynaphtho[2,1]thiazole, 5-ethoxy-naphtho[2,1]thiazole, 8-methoxynaphtho[1,2]thiazole, 7-methoxy-naphtho[1,2]thiazole, etc), a thianaphtheno-7',6',4,5-thiazole nucleus (e.g., 4'-methoxythianaphtheno-7',6',4,5-thiazole, etc), an oxazole nucleus (e.g., 4-methyloxazole, 5-methyloxazole, 4-phenyloxazole, 4,5-diphenyloxazole, 4-ethyloxazole, 4,5-dimethyl-oxazole, 5-phenyloxazole, etc), a benzoxazole nucleus (e.g., benzoxazole, 5chlorobenzoxazole, 5-methylbenzoxazole, 5-phenyl-benzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc), a naphthoxazole nucleus (e.g., naphtho-[1,2]oxazole, naphtho[2,1]oxazole, naphtho[2,3]oxazole, etc), a selenazole nucleus (e.g., 4-methylselenazole, 4-phenylselenazole, etc), a benzoselenazole nucleus (e.g., benzoselenazole, 5-chlorobenzoselenazole, 5-methoxybenzoselenazole, 5-hydroxy-benzoselenazole, tetrahydrobenzoselenazole, etc), a naphtho-selenazole nucleus (e.g., naphtho[1,2]selenazole, naphtho-[2,1]selenazole, etc), a thiazoline nucleus (e.g., thiazoline, 4-methylthiazoline, etc), a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc), a 4-quinoline nucleus (e.g., quinoline, 6-methoxyquinoline, 7-methylquinoline, 8-methylquino-line, etc), a 1-isoquinoline nucleus (e.g., isoquinoline, 3,4-dihydroisoquinoline, etc), a benzimidazole nucleus (e.g., 1,3-diethylbenzimidazole, 1-ethyl-3-phenylbenzimidazole, etc), a 3,3-dialkylindolenine nucleus (e.g., 3,3-dimethylindolenine, 3,3,5-trimethylindolenine, 3,3,7-trimethylindolenine, etc), a 2-pyridine nucleus (e.g., pyridine, 5-methylpyridine, etc), a 4-pyridine nucleus (e.g., pyridine etc), an imidazo[4,5-b]-quinoxaline nucleus (e.g., 1,3-dialkylimidazo[4,5-b]quinoxaline such as 1,3-diethylimidazo[4,5-b]quinoxaline, 6-chloro-1,3-diethylimidazo[4,5-b]quinoxaline, etc, 1,3-dialkenylimidazo-[4,5-b]quinoxaline such as 1,3-diallylimidazo[4,5-b]quinoxaline, 6-chloro-1,3-diallylimidazo[4,5-b]quinoxaline, etc, 1,3-diarylimidazo[4,5-b]quinoxaline such as 6,7-dichloro-1,3-diphenyl-imidazo[4,5-b]quinoxaline, 1,3-diphenylimidazo[4,5-b]quinoxaline, 6-chloro-1,3-diphenylimidazo[4,5-b]quinoxaline, 1,3-bis(p-chlorophenyl)imidazo[4,5-b]quinoxaline) etc.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-5}$ molar are employed, with solutions of from $10^{-2}$ to $10^{-4}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from one to about six carbon atoms and preferably from two to about four carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from one to about four carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, and entitled LASER MEDIA CONTAINING FLUORINATED ALCOHOLS, now U.S. Pat. No. 3,736,524, issued May 29, 1973. Also useful are heterocyclic compounds having a nitrogen heteroatom (e.g., pyridine, 2,6-dimethylpyridine, etc), and lower alkyl ketones such as dimethylketone. Of course, combinations of liquids can be used as can other solvents known to be useful in the dye laser art.

The present lasing media can be used in a variety of laser apparatus. A laser structure particularly adapted for testing organic dye liquid laser media is that described by Sorokin et al., IBM Journal, (supra). For continuous operation, the present lasing media can be used in apparatus of the type described in copending application of S. A. Tuccio and O. G. Peterson, Ser. No. 117,595, filed Feb. 22, 1971, and entitled CW ORGANIC DYE LASER.

The following examples are included for a further understanding of the invention. Unless otherwise stated, the excitation source in the following examples is a giant pulse from a 530.0 nm. frequency doubled, neodymium glass laser. The dye lasing medium is placed in a cuvette which is located between two dielectric mirrors which form a nearly hemispherical dye laser cavity. The light from the excitation or pumping source passes through one of the dielectric mirrors into the dye-containing cuvette and along the optical axis of the cavity. A beam splitter is used to sample the output from the excitation source in order to determine the wavelength of lasing.

EXAMPLE 1

The dye 4-dicyanomethylene-2-[(3-ethyl-2-benzoxazolinylidine)propenyl]-6-methyl-4H-pyran is mixed in methanol to an optical density of about 2.0 in a 5 cm. dye cuvette. The cuvette is placed between two dielectric mirrors as described above. The dye is found to lase at a wavelength of about 604 nm.

EXAMPLE 2

The dye of Example 1 is tested in an apparatus consisting of a Sorokin type coaxial flashlamp around a lasing cavity for optical excitation of the solution as described in U.S. Pat. No. 3,521,187, issued July 21, 1970, with the energy for the lamp stored by a Cornell Dubilier $1\mu f$ fast discharge capacitor. A $10^{-4}$ M solution of the dye in methanol is placed in the cavity and is observed to lase.

EXAMPLE 3

Example 1 is repeated except that the dye is 4-dicyanomethylene-2-[(3-ethyl-2-benzothiazolinylidene)propenyl]-6-phenyl-4H-pyran and the solvent is acetone. The dye lases at about 682 nm.

EXAMPLE 4

Example 1 is repeated except that the dye is 1,3-diethyl-5-
{2-[(3-ethyl-2-benzothiazolinylidene)methyl]-6-phenyl-4H-pyran-4-ylidene} barbituric acid and the solvent is acetone. The dye lases at about 602 nm.

EXAMPLE 5

Example 1 is repeated except that the dye is 4-dicyanomethylene-2-methyl-6-[(1,3,3-trimethyl-2-indolinylidene)propenyl]-4H-pyran and the solvent is acetone. The dye lases at about 614 nm.

EXAMPLE 6

Example 1 is repeated except that the dye is 1,3-diethyl-5-
{2-methyl-6-[(1,3,3-trimethyl-2-indolinylidene)propenyl]-4H-pyran-4-ylidene} barbituric acid. The dye lases at about 666 nm.

EXAMPLE 7

Example 1 is repeated except that the dye is 1,3-diethyl-5-
{2[(3-ethyl-2-benzoxazolylidene)propenyl]-6-methyl4H-pyran-4-ylidene} barbituric acid. The dye lases at about 648 nm.

EXAMPLE 8

Example 1 is repeated except that the dye is 1,3-diethyl-5-
{2-[(1-ethylnaphtho[1,2]thiazolin-2-ylidene)methyl]-6-methyl-4H-pyran-4-ylidene} barbituric acid. The dye lases at about 576 nm.

EXAMPLE 9

Example 1 is repeated except that the dye is 1,3-diethyl-5-
{2-[(3-ethyl-2-benzothiazolinylidene)methyl]-6-methyl-4H-pyran-4-ylidene} -2-thiobarbituric acid. The dye lases with two peaks at about 569 and 610 nm.

EXAMPLE 10

Example 1 is repeated except that the dye is 1,3-diethyl-5-
{ 2-[(3-ethyl-2-benzothiazolinylidene)methyl]-6-methyl-4H-pyran-4-ylidene} barbituric acid. The dye lases at about 560 nm.

EXMAPLE 11

Example 1 is repeated except that the dye is 4-dicyanomethylene-2-[(1-ethylnaphtho[1,2]thiazolin-2-ylidene)propenyl]-6-methyl-4H-pyran. The dye lases at about 656 nm.

EXAMPLE 12

Example 1 is repeated except that the dye is 4-dicyanomethylene-2-[(3-ethyl-2-benzothiazolinylidene)propenyl]-6- methyl-4H-pryan and the solvent is acetone. The dye lases at about 630 nm.

EXAMPLE 13

Example 1 is repeated except that the dye is 4-dicyanomethylene-2-[(3-ethyl-2-benzothiazolinylidene)methyl]-6-phenyl4H-pyran and the solvent is acetone. The dye lases at about 584 nm.

EXAMPLE 14

Example 1 is repeated except that the dye is 1,3diethyl-5-
{ 2-[(3-ethyl-2-benzothiazolinylidene)propenyl]-6-methyl-4H-pyran-4-ylidene} barbituric acid and the solvent is acetone. The dye lases at about 668 nm.

The invention has been described in detail with particular reference to certain preferred embodiments thereof, but it will be understood that variations and modifications can be effected within the spirit and scope of the invention.

We claim:

1. A dye laser comprising means containing a laser dye solution and a pumping energy source operably coupled therewith for producing a population inversion in said solution and means optically coupled with said solution for stimulating emission therefrom during said population inversion, said dye solution comprising a lasing concentration, in a noninterfering solvent, of a dye having the formula as follows:

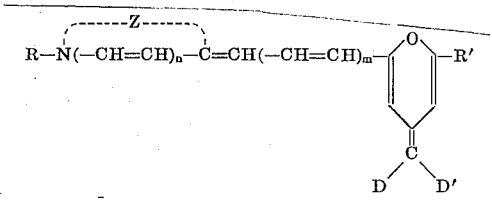

wherein:
R represents a member selected from the group consisting of an alkyl radical having one to about 10 carbon atoms, an alkenyl radical having two to about 10 carbon atoms and a phenyl radical;
R' represents a member selected from the group consisting of a hydrogen atom, an alkyl radical having one to about six carbon atoms and a phenyl radical;

$n$ represents an integer having a value of 0 or 1;
$m$ represents an integer having a value of 0, 1 or 2;

D and D' each represent a member selected from the group consisting of a cyano radical, an alkoxycarbonyl radical having one to about four carbon atoms in the alkyl moiety, an acyl radical having one to about four carbon atoms in the alkyl portion thereof, a phenylcarbonyl radical, an alkyl sulfonyl radical having one to five carbon atoms in the alkyl moiety, an aryl substituted sulfonyl radical, an aryloxy substituted sulfonyl radical and when D and D' are taken together with the carbon atom to which they are attached, represent a radical of the structure:

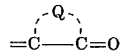

in which Q represents the non-metallic atoms necessary to complete a cyclic nucleus selected from the group consisting of an isoxazolinone nucleus, an oxindole nucleus, a 2,4,6-triketo-hexahydropyrimidine nucleus, a 2(3H)-imidazo[1,2-a]pyridone nucleus, a 5,7-dioxo-6,7-dihydro-5-thiazolo[3,2-a]pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazolinone nucleus, a 2-imino-2-oxazolin-4-one nucleus, a 2,4-imidazolidinedione nucleus, a 1,3-indanedione nucleus, a dione nucleus, a tetrone nucleus, or a 2-imidazolin-5-one nucleus; and Z represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkylindolenine nucleus, a 2-pyridine nucleus, a 4-pyridine nucleus and an imidazo[4,5-b]quinoxaline nucleus.

2. The invention as described in claim 1 wherein said dye is present in a concentration of about $10^{-2}$ to about $10^{-4}$ molar.

3. A dye laser comprising means containing a laser dye solution and a pumping energy source operably coupled therewith for producing a population inversion in said solution and means optically coupled with said solution for stimulating emission therefrom during said population inversion, said dye solution comprising a lasing concentration, in a non-interfering solvent, of a dye having the formula as follows:

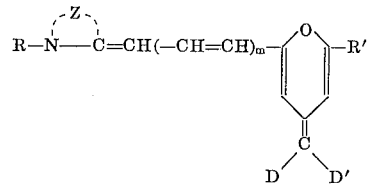

wherein:
R represents a member selected from the group consisting of an alkyl radical having one to about 10 carbon atoms, an alkenyl radical having two to about 10 carbon atoms and a phenyl radical;
R' represents a member selected from the group consisting of a hydrogen atom, an alkyl radical having one to about six carbon atoms and a phenyl radical;

$m$ represents an integer having a value of 0, 1 or 2;
D and D' each represent a cyano radical and when D and D' are taken together with the carbon atom to which they are attached, represent the atoms necessary to complete a 2,4,6-triketohexahydropyrimidine nucleus; and Z represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 1-isoquinoline nucleus, a benzimidazole nucleus, a 3,3-dialkylindolenine nucleus, a 2-pyridine nucleus, and an imidazo[4,5-b]-quinoxaline nucleus.

4. A dye laser comprising means containing a laser dye solution and a pumping energy source operably coupled therewith for producing a population inversion in said solution and means optically coupled with said solution for stimulating emission therefrom during said population inversion, said dye solution comprising a lasing concentration, in a non-interfering solvent, of a dye having the formula as follows:

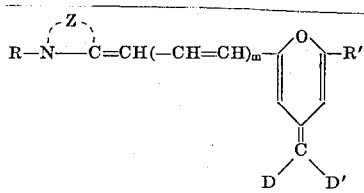

wherein:
R represents a member selected from the group consisting of an alkyl radical having one to about 10 carbon atoms, an alkenyl radical having two to about 10 carbon atoms and a phenyl radical;

R' represents a member selected from the group consisting of a hydrogen atom, an alkyl radical having one to about six carbon atoms and a phenyl radical;

m represents an integer having a value of 0, 1 or 2;

D and D' each represent a cyano radical and when D and D' are taken together with the carbon atom to which they are attached, represent the atoms necessary to complete a 2,4,6-triketohexahydropyrimidine nucleus; and Z represents the non-metallic atoms necessary to complete a heterocyclic nucleus selected from the group consisting of a thiazole nucleus, a benzothiazole nucleus, a naphthothiazole nucleus, an oxazole nucleus, a benzoxazole nucleus, a naphthoxazole nucleus and a 2-pyridine nucleus.

5. The invention as described in claim 4 wherein R' is an alkyl radical having one or two carbon atoms.

6. A method of producing coherent laser emission in the operation of a dye laser in the wavelength range of from about 500 to 1,000 nm comprising the step of optically pumping a dye solution to produce a population inversion in said solution and stimulating emission of radiation therefrom, said solution containing between about $10^{-2}$ to about $10^{-4}$ molar concentration of a lasing dye in a non-interfering solvent, said dye having the formula as follows:

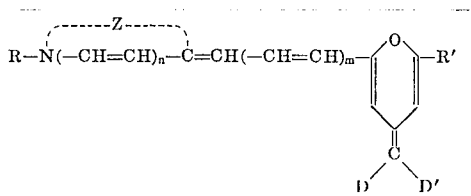

wherein:

R represents a member selected from the group consisting of an alkyl radical having one to about 10 carbon atoms, an alkenyl radical having two to about 10 carbon atoms and a phenyl radical;

R' represents a member selected from the group consisting of a hydrogen atom, an alkyl radical having one to about six carbon atoms and a phenyl radical;

n represents an integer having a value of 0 or 1;

m represents an integer having a value of 0, 1 or 2;

D and D' each represent a member selected from the group consisting of a cyano radical, an alkoxycarbonyl radical having one to about four carbon atoms in the alkyl moiety, an acyl radical having one to about four carbon atoms in the alkyl portion thereof, a phenyl carbonyl radical, an alkyl sulfonyl radical having one to five carbon atoms in the alkyl moiety, an aryl substituted sulfonyl radical, an aryloxy substituted sulfonyl radical, and when D and D' are taken together with the carbon atom to which they are attached, represent a radical of the structure:

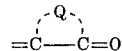

in which Q represents the non-metallic atoms necessary to complete a a cyclic nucleus selected from the group consisting of an isoxazolinone nucleus, an oxindole nucleus, a 2,4,6-triketo-hexahydropyrimidine nucleus, a 2(3H)-imidazo[1,2-a]pyridone nucleus, a 5,7-dioxo-6,7-dihydro-5-thiazolo[3,2-a]pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazolinone nucleus, a 2-imino-2-oxazolin-4-one nucleus, a 2,4-imidazolidinedione nucleus, a 1,3-indanedione nucleus, a dione nucleus, a tetrone nucleus, or a 2-imidazolin-5-one nucleus; and Z represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkylindolenine nucleus, a 2-pyridine nucleus, a 4-pyridine nucleus and an imidazo[4,5-b]quinoxaline nucleus.

7. The method as described in claim 6 wherein said dye is present in a concentration of about $10^{-2}$ to about $10^{-4}$ molar.

8. A method of producing coherent laser emission in the operation of a dye laser in the wavelength range of from about 500 to about 1,000 nm. comprising the step of optically pumping a dye solution to produce a population inversion in said solution and stimulating emission of radiation therefrom said solution containing between about $10^{-2}$ to about $10^{-4}$ molar concentration of a lasing dye in a non-interfering solvent, said dye having the formula as follows:

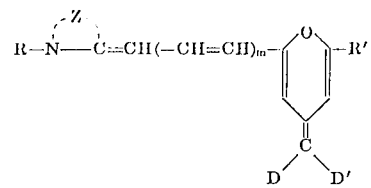

wherein:

R represents a member selected from the group consisting of an alkyl radical having one to about 10 carbon atoms, an alkenyl radical having two to about 10 carbon atoms and a phenyl radical;

R' represents a member selected from the group consisting of a hydrogen atom, an alkyl radical having one to about six carbon atoms and a phenyl radical;

m represents an integer having a value of 0, 1 or 2;

D and D' each represent a cyano radical and when D and D' are taken together with the carbon atom to which they are attached, represent the atoms necessary to complete a 2,4,6-triketohexahydropyrimidine nucleus; and Z represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 1-isoquinoline nucleus, a benzimidazole nucleus, a 3,3-dialkylindolenine nucleus, a 2-pyridine nucleus, and an imidazo[4,5-b]-quinoxaline nucleus.

9. A method of producing coherent laser emission in the operation of a dye laser in the wavelength range of from about 500 to about 1,000 nm. comprising the step of optically pumping a dye solution to produce a population inversion in said solution and stimulating emission of radiation therefrom said solution containing between about $10^{-2}$ to about $10^{-4}$ molar concentration of a lasing dye in a non-interfering solvent, said dye having the formula as follows:

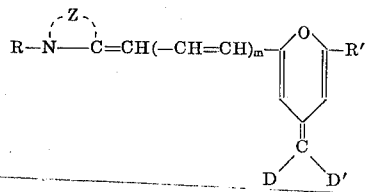

wherein:
R represents a member selected from the group consisting of an alkyl radical having one to about 10 carbon atoms, an alkenyl radical having two to about 10 carbon atoms and a phenyl radical;
R' represents a member selected from the group consisting of a hydrogen atom, an alkyl radical having one to about six carbon atoms and a phenyl radical;
m represents an integer having a value of 0, 1 or 2;
D and D' each represent a cyano radical and when D and D' are taken together with the carbon atom to which they are attached, represent the atoms necessary to complete a 2,4,6-triketohexahydropyrimidine nucleus; and
Z represents the non-metallic atoms necessary to complete a heterocyclic nucleus selected from the group consisting of a thiazole nucleus, a benzothiazole nucleus, a naphthothiazole nucleus, an oxazole nucleus, a benzoxazole nucleus, a naphthoxazole nucleus and a 2-pyridine nucleus.

10. The method as described in claim 9 wherein R' is an alkyl radical having one or two carbon atoms.

11. A method of producing coherent laser emission in the operation of a dye laser in the wavelength range of from about 500 to about 1,000 nm comprising the step of optically pumping a dye solution to produce a population inversion in said solution and stimulating emission of radiation therefrom, said solution containing between about $10^{-2}$ to about $10^{-4}$ molar concentration of a lasing dye in a non-interfering solvent, said dye comprising a merocyanine dye having a pyran nucleus as part of the intercyclic chain and said dye having the formula as follows:

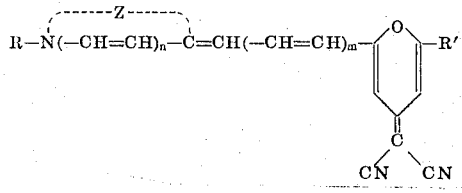

wherein:
R represents a member selected from the group consisting of an alkyl radical having one to about 10 carbon atoms, an alkenyl radical having two to about 10 carbon atoms and a phenyl radical;
R' represents a member selected from the group consisting of a hydrogen atom, an alkyl radical having one to about six carbon atoms and a phenyl radical;
n represents an integer having a value of 0 or 1;
m represents an integer having a value of 0, 1 or 2; and Z represents the non-metallic atoms necessary to complete a benzoxazole nucleus.

12. The method as described in claim 11 wherein R and R' each represent an alkyl radical having one to about four and one to about two carbon atoms, respectively.

13. The method as described in claim 11 wherein n is 0.

14. The method as described in claim 11 wherein said dye is 4-dicyanomethylene-2-[(3-ethyl-2-benzoxazolinylidene)-propenyl]-6-methyl-4H-pyran.

15. The method as described in claim 11 wherein said dye is selected from the group consisting of 4-dicyanomethylene-2-[(3-ethyl-2-benzothiazolinylidene)propenyl]-6-phenyl-4H-pyran; 1,3-diethyl-5-{2-[(3-ethyl-2-benzothiazolinylidene)-methyl]-6-phenyl-4H-pyran-4-ylidene} barbituric acid; 4-dicyanomethylene-2-methyl-6-[(1,3,3-trimethyl-2-indolinylidene)-propenyl]-4H-pyran; 1,3-diethyl-5-{2-methyl-6-[(1,3,3-trimethyl2-indolinylidene)propenyl]-4H-pyran-4-ylidene} barbituric acid; 1,3-diethyl-5-{2[(3-ethyl-2-benzoxazolylidene)propenyl]-6methyl-4H-pyran-4-ylidene} barbituric acid; 1,3-diethyl-5-{2-[(1-ethylnaphtho[1,2]thiazolin-2-ylidene)methyl]-6-methyl4H-pyran-4-ylidene} barbituric acid; 1,3-diethyl-5-{2-[(3-ethyl2-benzothiazolinylidene)methyl]-6-methyl-4H-pyran-4-ylidene}-2-thiobarbituric acid; 1,3-diethyl-5-{2-[(3-ethyl-2-benzothiazolinylidene)methyl]-6-methyl-4H-pyran-4-ylidene} barbituric acid; 4-dicyanomethylene-2-[(1-ethylnaphtho[1,2]thiazolin- 2-ylidene)propenyl]-6-methyl-4H-pyran; 4-dicyanomethylene-2-[(3-ethyl-2-benzothiazolinylidene)propenyl]-6-methyl-4H-pyran; 4-dicyanomethylene-2-[(3-ethyl-2-benzothiazolinylidene)methyl]-6-phenyl-4H-pyran; and 1,3-diethyl-5-{2-[(3-ethyl-2-benzothiazolinylidene)propenyl]-6-methyl-4H-pyran-4-ylidene} barbituric acid.

* * * * *